(12) United States Patent
Hasuka et al.

(10) Patent No.: US 7,377,345 B2
(45) Date of Patent: May 27, 2008

(54) IDLE CONTROL SYSTEM FOR FUEL CELL VEHICLE

(75) Inventors: Yoshinobu Hasuka, Utsunomiya (JP); Hibiki Saeki, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 195 days.

(21) Appl. No.: 10/619,408

(22) Filed: Jul. 15, 2003

(65) Prior Publication Data
US 2004/0013920 A1    Jan. 22, 2004

(30) Foreign Application Priority Data
Jul. 17, 2002    (JP) .............................. 2002-208224

(51) Int. Cl.
*B60L 11/18*    (2006.01)
(52) U.S. Cl. ...................... 180/65.3; 180/65.2; 701/22
(58) Field of Classification Search ................. 180/6.5, 180/220, 53.4, 65.1, 65.2, 65.3, 65.4, 60, 180/293; 701/22
See application file for complete search history.

(56) References Cited

U.S. PATENT DOCUMENTS

| | | | | |
|---|---|---|---|---|
| 5,629,102 A | * | 5/1997 | Werth | 429/17 |
| 5,643,352 A | * | 7/1997 | Werth | 75/255 |
| 5,678,647 A | * | 10/1997 | Wolfe et al. | 180/65.3 |
| 5,820,172 A | * | 10/1998 | Brigham et al. | 290/40 C |
| 6,116,363 A | * | 9/2000 | Frank | 180/65.2 |
| 6,158,537 A | * | 12/2000 | Nonobe | 180/65.3 |
| 6,230,496 B1 | * | 5/2001 | Hofmann et al. | 60/706 |
| 6,307,277 B1 | * | 10/2001 | Tamai et al. | 290/40 C |
| 6,333,620 B1 | * | 12/2001 | Schmitz et al. | 320/132 |
| 6,380,638 B1 | * | 4/2002 | Bitsche et al. | 290/40 C |
| 6,388,421 B2 | * | 5/2002 | Abe | 320/104 |
| 6,461,751 B1 | * | 10/2002 | Boehm et al. | 429/13 |
| 6,484,075 B2 | * | 11/2002 | Hasegawa et al. | 701/22 |
| 6,701,229 B2 | * | 3/2004 | Iwasaki | 701/22 |
| 6,777,909 B1 | * | 8/2004 | Aberle et al. | 320/104 |
| 6,828,051 B2 | * | 12/2004 | Yamanashi | 429/24 |

(Continued)

FOREIGN PATENT DOCUMENTS

DE    19731250 A1    1/1998

(Continued)

OTHER PUBLICATIONS

German Office Action Application No. 10332129.2-32, dated Jan. 16, 2006.

(Continued)

*Primary Examiner*—Christopher P. Ellis
*Assistant Examiner*—Vaughn T Coolman
(74) *Attorney, Agent, or Firm*—Lahive & Cockfield, LLP; Anthony A. Laurentano, Esq.

(57) ABSTRACT

An idle control system applicable to a fuel cell vehicle 1 is provided for improving the fuel efficiency. When the fuel cell vehicle is determined to be in a predetermined idle mode, the idle control system stops a compressor to thereby stop power generation of a fuel cell. In contrast, when the state of charge of the capacitor 4 falls below a predetermined value while the fuel cell vehicle is in the idle mode, the idle control system drives the compressor 8 by means of the capacitor to drive the fuel cell in order to charge the capacitor.

5 Claims, 5 Drawing Sheets

U.S. PATENT DOCUMENTS

| | | | |
|---|---|---|---|
| 6,920,948 B2 * | 7/2005 | Sugiura et al. | 180/65.2 |
| 2002/0096376 A1 * | 7/2002 | Iwasaki | 180/65.2 |
| 2002/0162694 A1 * | 11/2002 | Iwasaki | 180/65.3 |

FOREIGN PATENT DOCUMENTS

| | | |
|---|---|---|
| DE | 19810467 C1 | 10/1999 |
| DE | 19954306 B4 | 7/2001 |
| JP | 08-317505 | 11/1996 |
| JP | 2001-307758 | 11/2001 |

OTHER PUBLICATIONS

Office Action Issued Dec. 5, 2006 in counterpart application JP 2002-208224.

* cited by examiner

IDLE CONTROL SYSTEM FOR FUEL CELL VEHICLE

BACKGROUND OF THE INVENTION

1. Field of the Invention

The present invention relates to an idle control system for a fuel cell vehicle, and in particular relates to an idle control system for a fuel cell vehicle, which is installed in a hybrid-type power supply provided with a fuel cell and a power storage device which is recharged by generated current from the fuel cell.

2. Description of the Related Art

Heretofore there is known a fuel cell vehicle provided with a solid polymer membrane-type fuel cell, in which the responsiveness of the output supply to each part of the vehicle is increased by providing a power storage device comprising for example a battery or a capacitor and the like, in order to supplement the output responsiveness of the fuel cell accompanying the gas supply of hydrogen gas as a fuel and air as an oxidizing gas.

As such a fuel cell vehicle there is for example one disclosed in Japanese Unexamined Patent Application, First Publication No. 2001-359204, which is provided with an idle control system which detects an idle state where it is possible to stop power generation of the fuel cell, and stops power generation of the fuel cell, and resumes power generation of the fuel cell when the state of charge of the power storage device is less than a predetermined state of charge.

However, in the conventional technology, the target amount of power generated in the case of resuming power generation of the fuel cell is set depending on the state of charge of the power storage device and the expected power consumption of the electrical load of the vehicle. Therefore, the amount of power generated by the fuel cell fluctuates depending on the state of the electrical load, and hence there is no appreciable increase in the efficiency of power generation by the fuel cell. Also, there is concern that the amount of noise generated by the air supply compressor which supplies the reaction gas air to the fuel cell, fluctuates depending on the target amount of power generated by the fuel cell.

In particular, in cases where the state of charge of the power storage device is low, and where the expected power consumption of the electrical load of the vehicle is high, the target amount of power generated by the fuel cell is increased. However, a supply of reaction gas to match to the increase of the amount of power generated by the fuel cell is necessary, and hence the power required by the air supply compressor also increases. Therefore, as the amount of power generated by the fuel cell becomes greater, the power consumed in order to drive the compressor is increased, and there have been problems with a reduction in the overall efficiency of power generation.

SUMMARY OF THE INVENTION

The present invention takes the above situation into consideration, with the object of providing an idle control system for a fuel cell vehicle in which it is possible to improve fuel consumption efficiency by increasing the overall power generation efficiency.

In order to solve the above problem, a first aspect of the present invention provides an idle control system applicable to a fuel cell vehicle (for example, the fuel cell vehicle 1 in the embodiment), wherein the fuel cell vehicle comprises a fuel cell (for example the fuel cell 3 in the embodiment) to which reaction gases are supplied by an air supply compressor (for example, the air compressor 8 in the embodiment) and by a hydrogen supply device (for example, the hydrogen tank 9 in the embodiment) to generate power, a driving motor (for example, the driving motor 5 in the embodiment) which is driven by a current generated by the fuel cell, and a power storage device (for example, the capacitor 4 in the embodiment) which is charged by the current generated by the fuel cell, and the idle control system for controlling the fuel cell vehicle according to driving modes wherein when it is determined that the fuel cell vehicle is in a normal driving state (for example, a normal power generation mode M01, in the embodiment), and not in an idle state, the control system (for example the control unit 7 in the embodiment) drives the fuel cell to generate electric current corresponding to a required power for driving the driving motor and the auxiliary equipment; when it is determined that the fuel cell vehicle is in a predetermined idle state (for example, an idle stop mode M02 in the embodiment), the control system (for example the control unit 7 in the embodiment) stops the compressor for stopping the fuel cell to stop power generation of the fuel cell; and while the fuel cell vehicle is in a predetermined idle state (for example, an idle charge mode M03 in the embodiment), when it is determined that the state of charge of the power storage device decreases below a predetermined state of charge of the power storage device (for example the low load zone L in the embodiment), a control system (for example, the control unit 7 in the embodiment) drives the fuel cell to generate a current for charging the power storage device.

According to the first aspect, fuel cell is efficiently driven depending on the driving state of the fuel cell vehicle. When the fuel cell vehicle is in a normal driving state, the fuel cell is activated such that the fuel cell can supply the required current for the driving motor and auxiliary equipment. When the fuel cell vehicle is in a predetermined idle stop state (for example in the idle stop mode M02 in the embodiment), power generation by the fuel cell is stopped by stopping the air compressor. In addition, while the fuel cell vehicle is in the predetermined idle state, and when the state of charge of the power storage device falls below the predetermined value, the fuel cell is driven so as to execute power generation at an optimum generation efficiency, and the power storage device is charged by the current generated by the fuel cell.

According to the second aspect of the present invention, in an idle control system of a fuel cell according to the first aspect, the power generation efficiency of the fuel cell system is defined by {(total electric power generated by the fuel cell-electric power consumed by the compressor for supplying the reaction gas to fuel the cell)/total electric power generated by the fuel cell}.

According to the third aspect, in the idle control system according to the first aspect, the predetermined idle state is determined based on an operating state of an accelerator pedal by a driver.

DETAILED DESCRIPTION OF THE INVENTION

Figure 1:
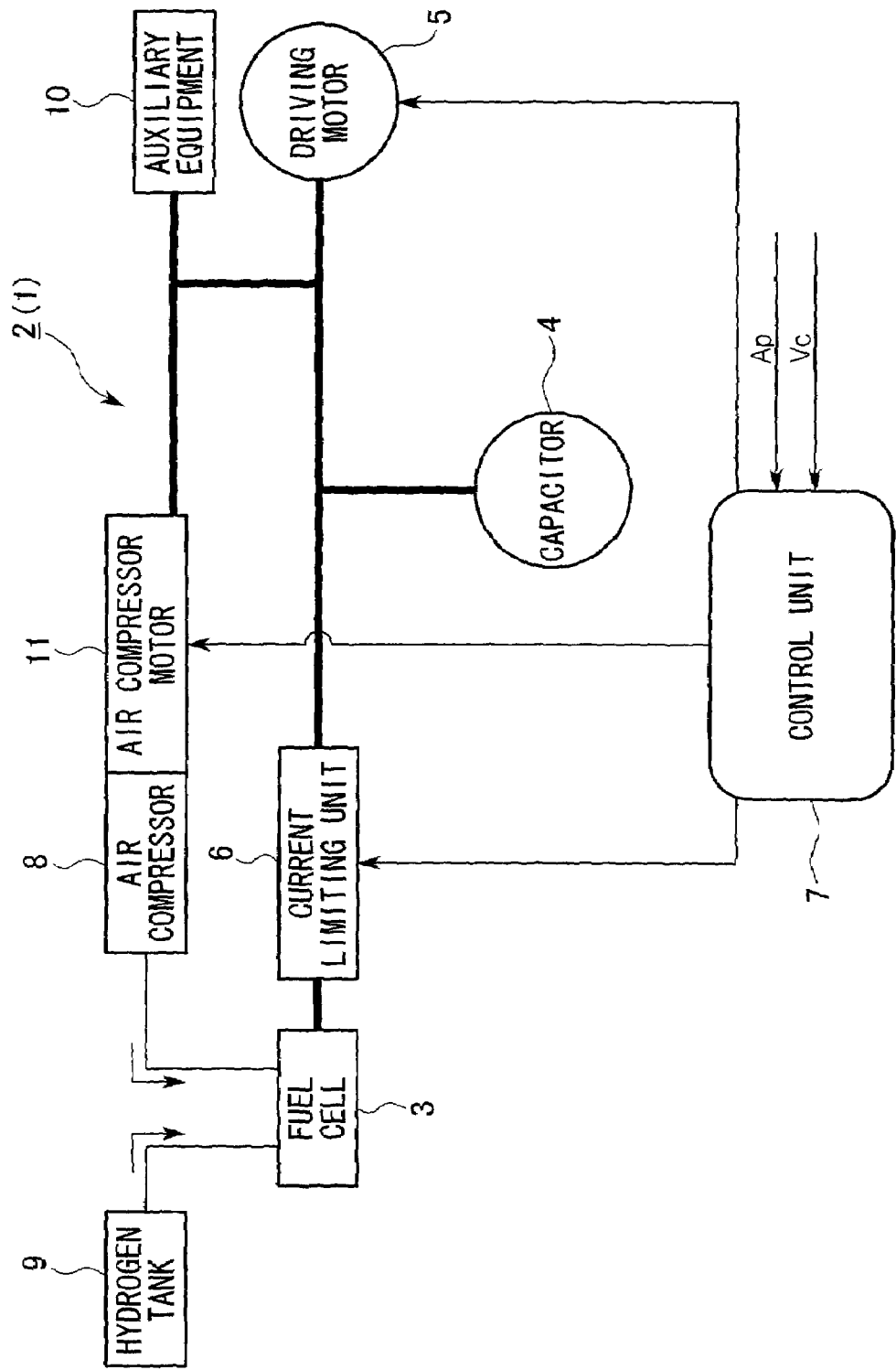
FIG. 1 is a schematic block diagram showing an idle control system for a fuel cell vehicle according to an embodiment of the present invention.

Hereunder an embodiment of an idle control system for a fuel cell vehicle according to the present invention is described with reference to the appended drawings. FIG. 1 is a schematic block diagram of a fuel cell vehicle 1, which is provided with an idle control system 2 for a fuel cell vehicle according to the embodiment of the present invention. The idle control system 2 according to this embodiment is provided with a hybrid-type power supply unit comprising for example a fuel cell 3 and a capacitor 4, being a power storage device.

The fuel cell 3 is integrally formed by multi-layer lamination of unit fuel cell comprising a solid polymer electrolyte membrane sandwiched between an anode electrode and a cathode electrode. A high-pressure hydrogen tank 9, for example, is connected to the anode electrode of the fuel cell 3, and hydrogen is supplied from the hydrogen tank 9 to the anode electrode. Also, an air compressor 8 is connected to the cathode electrode of the fuel cell 3, and air (oxygen) is supplied from the air compressor 8 to the cathode electrode. When hydrogen is supplied to the reaction surface of the anode electrode, the hydrogen is ionized there and migrates to the cathode electrode through the solid polymer electrolyte membrane. Electrons created at this time are taken out to an external circuit and used as direct current electrical energy.

A current limiting unit 6 is connected to the fuel cell 3. This current limiting unit 6 is also connected to the capacitor 4, a driving motor 5, auxiliary equipment (such as air conditioning and head lamps mounted on the vehicle 1) 10, and an air compressor motor 11, and limits the power from the fuel cell 3 as required, to supply power to these items 4, 5, 10, and 11. The air compressor motor 11 is coupled to the air compressor 8, and the air compressor 8 is driven by operating the air compressor motor 11. Consequently, part of the power generated by the fuel cell 3 is used to drive the air compressor 8, which supplies the reaction gas (oxidizing gas).

The capacitor 4 is for example an electric double layer capacitor, charged by a current generated by the fuel cell 3, and is provided with the function of assisting the power generation of the fuel cell 3 by supplying power stored in the capacitor 4 to the driving motor 5 and the auxiliary equipment 10.

The driving motor 5 connected to the fuel cell 3 and to the capacitor 4 produces driving power from the power supplied from the fuel cell 3 and the capacitor 4. This driving power is transmitted to driving wheels (not shown in figure) through a reduction or a transmission T/M, to thereby drive the fuel cell vehicle 1.

Also, when the fuel cell vehicle 1 decelerates and driving power is transmitted from the driving wheels to the driving motor 5, the driving motor 5 functions as a power generator, and generates a so-called regenerative braking force. As a result, the kinetic energy of the vehicle body can be recovered as electrical energy, and the electrical energy is stored in the capacitor 4.

A control unit 7 is connected to the fuel cell 3, a current limiting unit 6, the driving motor 5, and the air compressor motor 11. This control unit 7 calculates the required power, based on an accelerator pedal depression amount Ap and the vehicle speed Vc and so on, and controls the respective control signals to the fuel cell 3 and current limiting unit 6, the driving motor 5, and the air compressor motor 11, based on the calculated power.

Figure 4:
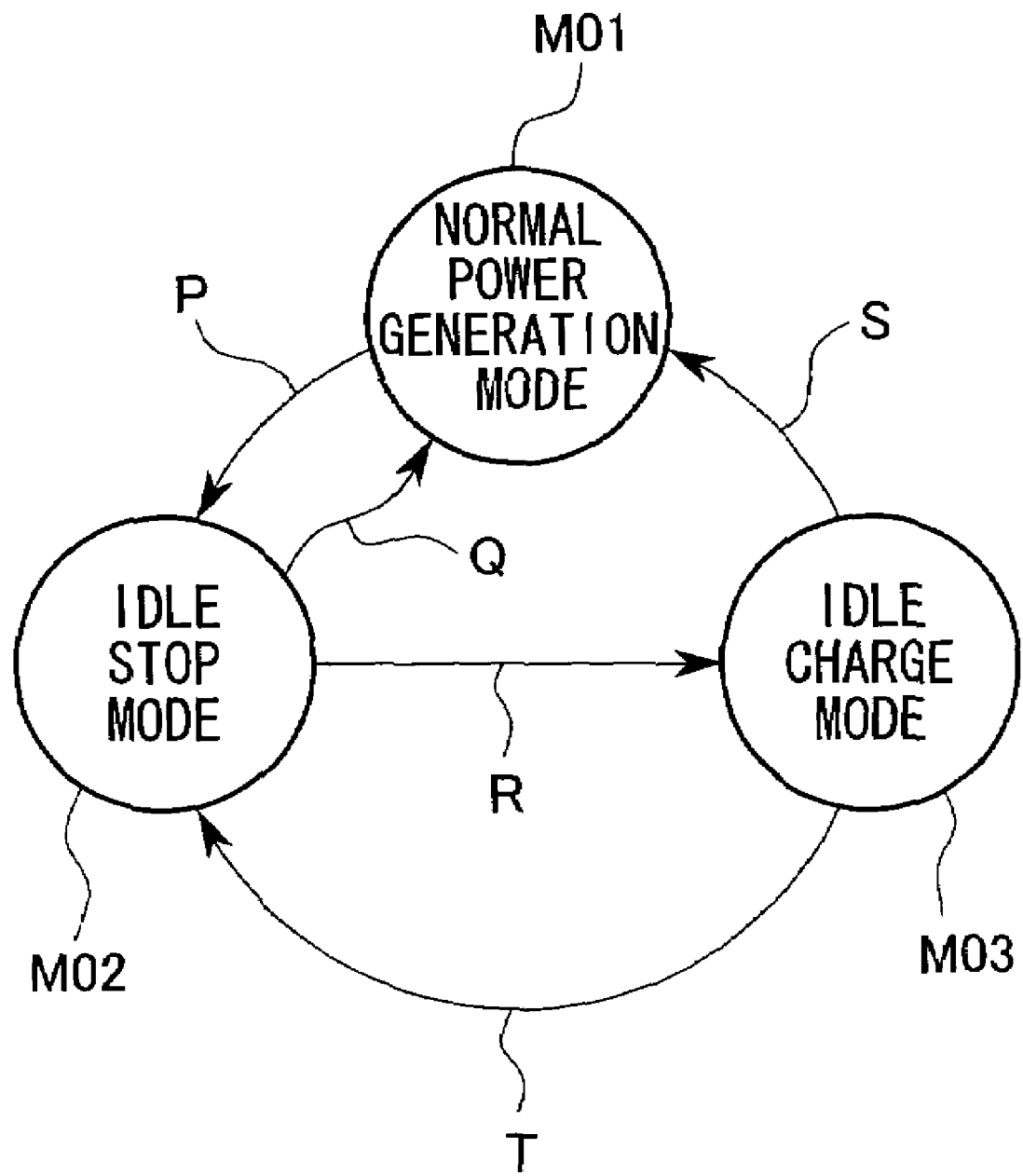
FIG. 4 is a state transition diagram of the modes of the idle control system in FIG. 1.

As shown in FIG. 4, the fuel cell 3, the current limiting unit 6, and the driving motor 5 are switched between a normal power generation mode M01, an idle stop mode M02, and an idle charge mode M03, according to instructions from the control unit 7. This will be discussed later.

Figure 2:
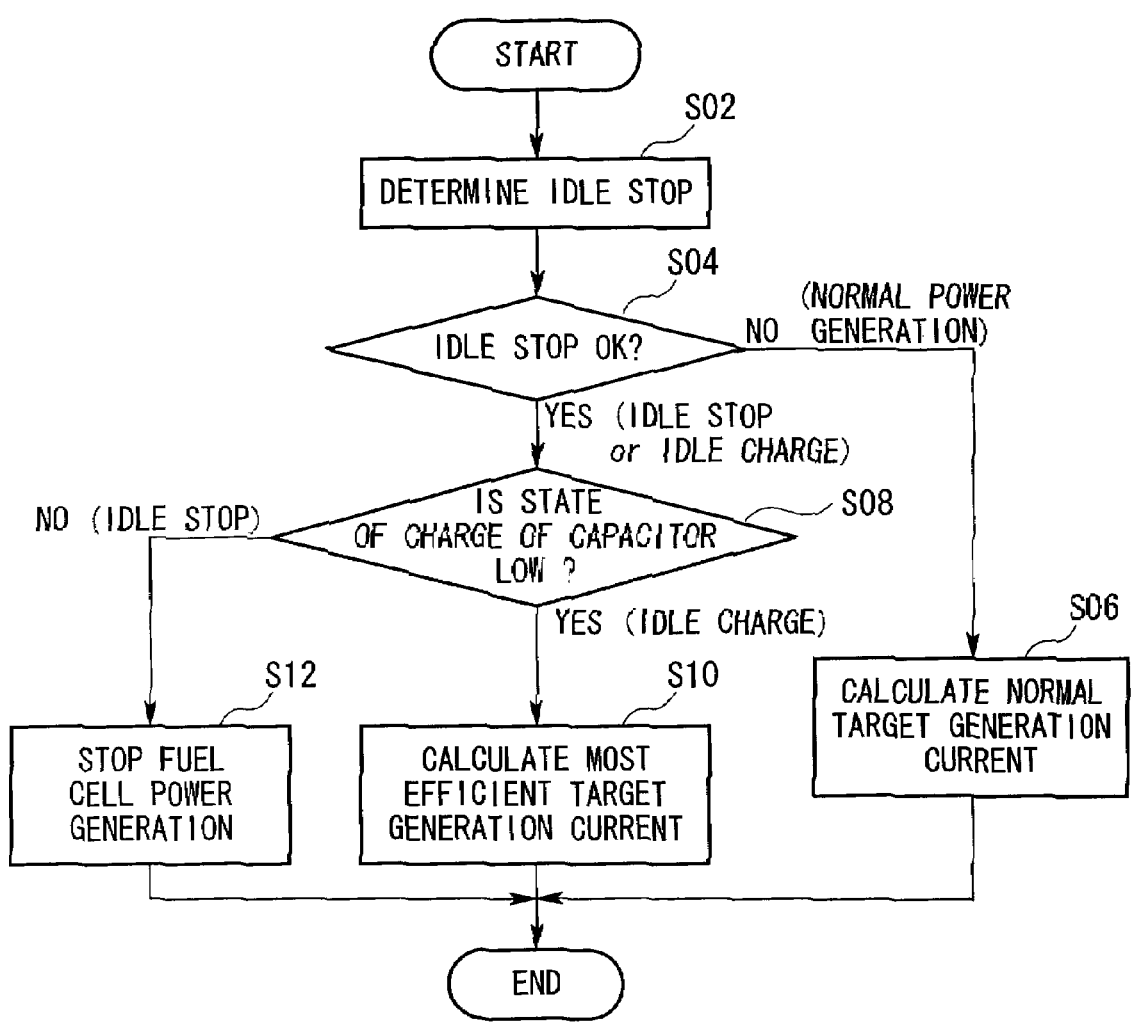
FIG. 2 is a flow chart showing idle stop and idle charge control of the idle control system in FIG. 1.

FIG. 2 is a flow chart showing idle stop and idle charge control according to the present embodiment. In step S02, the control unit 7 performs idle stop determination. This determination determines whether the speed Vc of the fuel cell vehicle 1 is lower than a predetermined value, whether the expected power consumption of the driving motor is lower than a predetermined value, whether the power of the electrical load (driving motor 5, auxiliary equipment 10) is lower than a predetermined value, and so on. Then, in step S04, it is determined whether or not idle stop is possible.

In the case where it is determined in step S04 that idle stop is not possible, the control unit 7 controls the normal power generation mode M01, and in step S06 calculates the normal target generation current. In this normal power generation mode M01, the control unit 7 obtains the power required by the driving motor 5 from the accelerator pedal depression amount Ap, and also obtains the power required by the air conditioning and other auxiliary equipment 10. Then, in order to generate both required powers, the control unit 7 obtains the power required by the air compressor motor 11 necessary to drive the air compressor 8, and obtains the total power required after adding all these power requirements. The control unit 7 obtains a required supply amount of reaction gas necessary for the generation of power by the fuel cell 3 so as to satisfy this total power requirement, and controls the air compressor motor 11 so as to supply this required amount of the reaction gas to the fuel cell 3. Then, the process of this flow is complete.

Consequently, because the generated current of the fuel cell 3 in this normal power generation mode M01 changes according to the demand of the electrical load, the vehicle is driven in zones where the power generating efficiency of the fuel cell 3 is not at optimum conditions.

In the case where it is determined in step S04 that idle stop is possible, in step S08 the control unit obtains the state of charge of the capacitor 4 based on the voltage thereof, and determines whether or not the state of charge is lower than a predetermined value.

In the case where in step S08 the determination is NO, the the control unit 7 controls the idle stop mode M02, and in step S12 controls the stopping of power generation of the fuel cell 3. That is, it sets the rotation speed of the air compressor 8 to zero, and also sets the electrical current instruction for the current limiting unit 6 to zero. In this manner, by stopping the power generation of the fuel cell 3, the hydrogen gas and the oxidizing gas necessary for the generation of power can be reduced, and because there is no need for the power necessary to drive the air compressor 8 and the like in order to supply these reaction gases, fuel consumption efficiency can be improved. In this idle stop mode M02, the supply of power to the electrical load of the vehicle 1 is performed by the capacitor 4. Then, the process of this flow is complete.

In the case where in step S08 the determination is YES, the control unit 7 controls the idle charge mode M03, and in step S10 calculates the most efficient target generation current for the fuel cell 3, and controls power generation at this current. This will be explained using FIG. 3.

Figure 3:
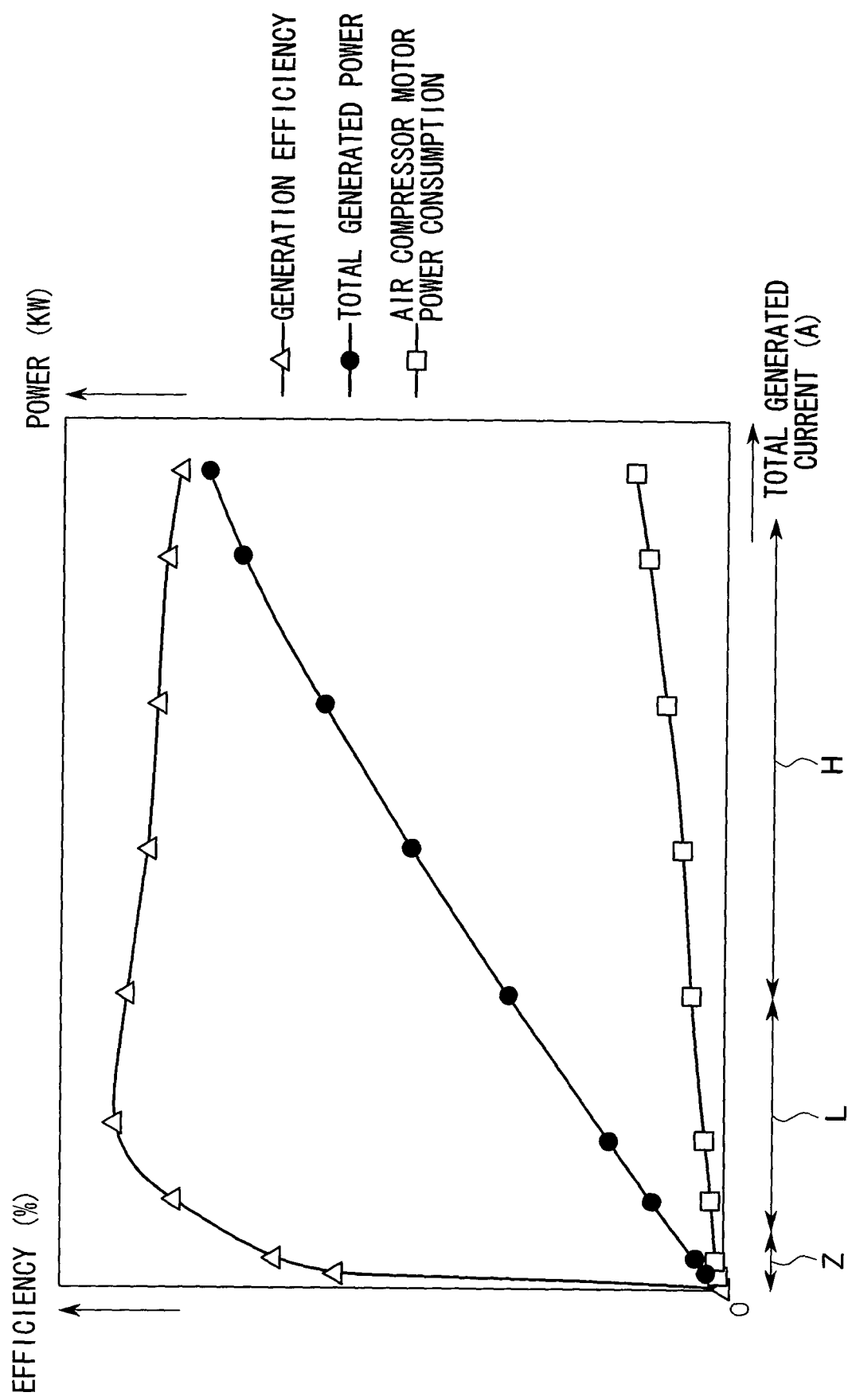
FIG. 3 is a graph showing the relationship between generated current and overall efficiency.

FIG. 3 is a graph showing the relationship between the generated current and the overall efficiency. In this graph, the total generated current (A) generated by the fuel cell 3 is on the horizontal axis, the power generation efficiency (%) of the fuel cell 3 is on the left vertical axis, and the power (kW) is on the right vertical axis. Moreover, the power generation efficiency (Δ), the total generated power (•) and the power consumption of the air compressor motor 11 (□) are shown in this graph.

The power generation efficiency shown in the same graph is expressed by the equation below.

Power Generation Efficiency=(power actually able to be supplied to the electrical load/total generated power)×100(%)={(total generated power−power consumption of the compressor motor 11)/total generated power}×100(%)   Equation 1

Hereunder this equation will be explained. Because one part of the total power generated by the fuel cell 3 is used by the motor 11 in order to drive the compressor 8 to supply the reaction gas (air), the power actually able to be supplied to the electrical load is the power remaining after the power necessary to drive the compressor 8 (power consumed by the motor 11) has been subtracted from the total generated power.

Consequently, in a zone where the generated electric current is low (zero proximity zone Z), because the greater part of the generated current is consumed by the compressor motor 11, power generation efficiency is low.

In a low load zone L where the generated current of the fuel cell 3 is increased to more than that in the zero proximity zone Z, because the generated power increases considerably, the proportion of power consumed by the compressor motor 11 is relatively reduced, and the power able to be supplied to the electrical load also increases. Therefore, power generation efficiency rises in the low load zone L.

Then, in a high load zone H where the generated current is further increased to more than in the low load zone L, the generated voltage decreases by the IV (current·voltage) characteristic of the fuel cell 3. Therefore, the total power generated by the fuel cell 3 (voltage×current) does not increase in direct proportion to the generated current, and the rate of increase of the total power generated decreases.

On the other hand, power consumption of the compressor motor 11, regardless of the generated current zones Z, L and H, increases almost in direct proportion to the generated current. Therefore, power generation efficiency in the high load zone H where the generated current is high, decreases in comparison to the low load zone L.

Consequently, power generation efficiency is the largest in the low load zone L.

In the idle charge mode M03, regardless of the state of the electrical load, because the fuel cell 3 generates power in an operating zone (low load zone L) with a more efficient power generation than in a normal operating zone (high load zone H), the electrical load can be driven while continuing to charge the capacitor 4, and it becomes possible to further improve fuel consumption efficiency. Moreover, during this power generation, the amount of reaction gas required is comparatively low, and the noise of the air compressor 8 can be maintained at a low noise level. Therefore the level of comfort can be improved. Furthermore, in the case where the amount of power required by the electrical load is larger than the amount of power generated by the fuel cell 3, there is no problem because the deficiency in the amount of power generated by the fuel cell 3 is supplemented by power from the capacitor 4 to supply power to the electrical load.

FIG. 4 is a state transition diagram of the modes in the idle control system 2. During operation in the normal power generation mode MO 1, in the case where the operating conditions for possible idle stop operation as shown in the above steps S02 and S04 have been met, a transfer to the idle stop mode M02 takes place as indicated by the arrow P. Then, in the case where the state of charge of the capacitor 4 is lower than a constant, a transfer to the idle charge mode M03 takes place as indicated by the arrow R, and charging of the capacitor 4 takes place as mentioned above. Then, in the case where the state of charge of the capacitor 4 is greater than the constant, a transfer to the idle stop mode M02 takes place as indicated by the arrow T. Also, in the case where an intent to accelerate is detected from the accelerator pedal depression amount Ap while in the idle stop mode M02 or the idle charge mode M03, a transfer to the normal power generation mode M01 takes place as indicated by the arrows Q and S.

An idle control system for a fuel cell vehicle according to the present invention has been described in the above embodiment, but the present invention is not limited to this. For example, it is possible to use a battery instead of a capacitor as a power storage device.

As described above, according to the present invention, fuel consumption efficiency can be improved by stopping the power generation of the fuel cell when an idle state is determined, and the fuel cell can be restarted smoothly. Also, because the fuel cell generates power in a more efficient manner than the normal operating zone when the state of charge of the power storage device is low, it becomes possible to further improve fuel consumption efficiency. Moreover, during power generation by the fuel cell, the noise of the compressor can be maintained at a low noise level, and hence the level of comfort can be improved.

Figure 5:
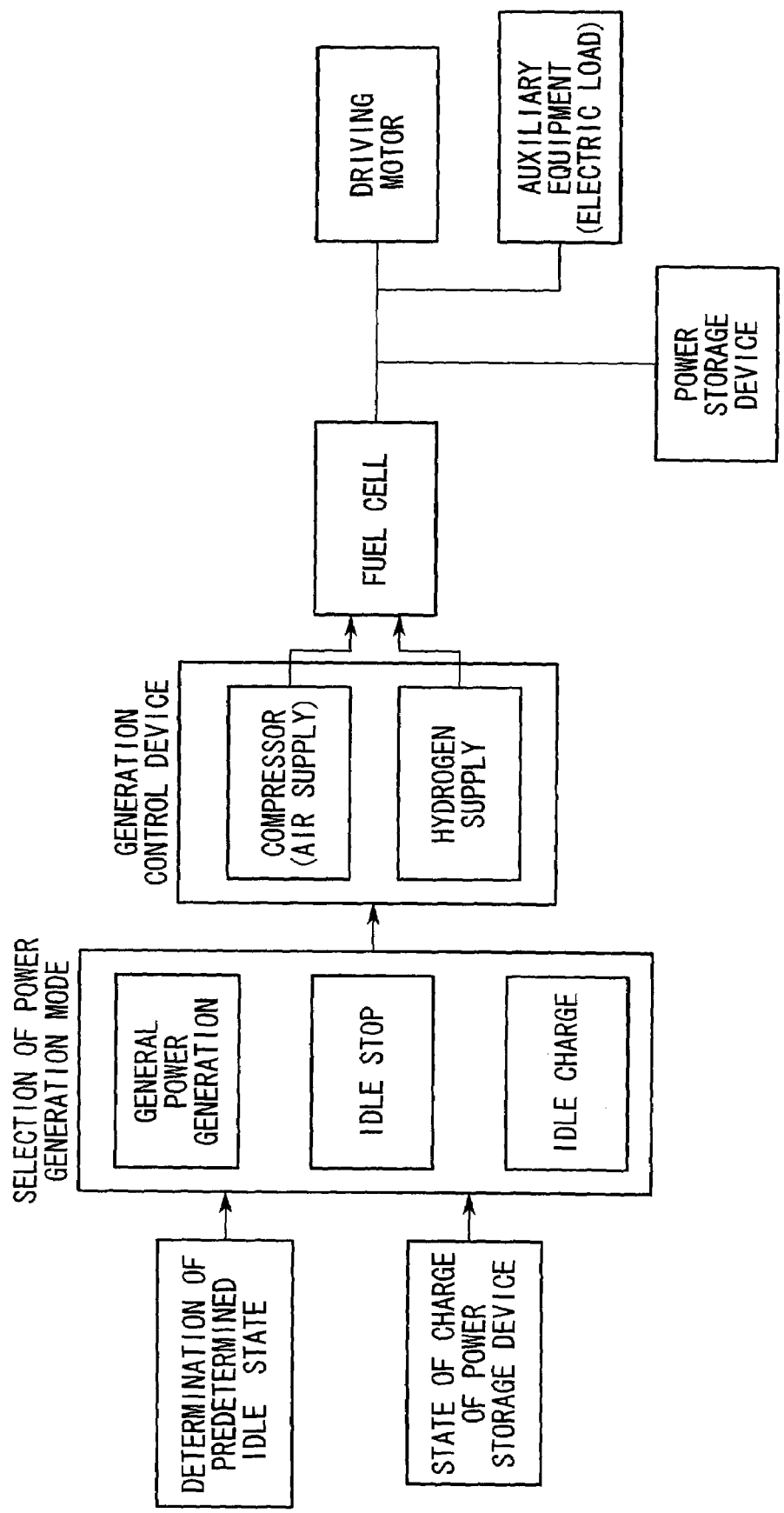
FIG. 5 is a block diagram showing the idle control system for fuel cell vehicle according to the present invention.

The present invention will be summarizingly described with reference to FIG. 5.

In the present invention, the control system of the fuel cell vehicle selects a power generation mode depending on whether the fuel cell vehicle is in an idle state and whether the state of charge of the power storage device is low or not. The following power generation modes are selected.

(1) Normal generation mode: when it is determined that the fuel cell vehicle is in a normal driving mode and not in a idle stop mode, the control system sets the current generated by the fuel cell depending on the required amount of currents for driving the motor and auxiliary equipment (electric load, for example, air compressor);

(2) Idle stop mode: when it is determined that the fuel cell vehicle is in an idle stop mode, the control system stops power generation of the fuel cell (that is, the control system sets the current generated by the fuel cell to zero); and (3) Idle charge mode: when it is determined that the state of charge of the power storage device falls to a low level, and while the fuel cell vehicle is in the idle stop mode, the control system sets the current generated by the fuel cell according to the optimum power generation efficiency of the fuel cell.

Based on the above mode, the generation currents by the fuel cell is determined, and power generation of the fuel cell is executed by controlling amounts of reaction gases comprising air and hydrogen.

What is claimed is:

1. In a fuel cell vehicle equipped with a fuel cell, an idle control system, a driving motor, a power storage device, a hydrogen supply, an air compressor and auxiliary equipment, a method of generating electrical current comprising the steps of:

identifying the occurrence of an idle state, said idle state being based on at least one of the speed of said fuel cell vehicle being lower than a predetermined value, the expected power consumption of the driving motor being lower than a predetermined value or an electrical power load of an electrical load being lower than a predetermined value;

selecting a power generation mode in response to the occurrence of the idle state; and adjusting the power generation of the fuel cell based on the selected power generation mode using said idle control system, wherein the selection of a power generation mode includes the steps of:

selecting an idle charge mode, said idle charge mode being selected based on a determination that said power storage device does not exceed a predetermined parameter; and adjusting the electrical current generated by the fuel cell according to an optimum power generation efficiency of the fuel cell, said optimum power generation efficiency being based on identified parameters, and wherein the adjustment of the electrical current generated by the fuel cell to an optimum level according to said optimum power generation efficiency includes the further steps of:

determining a total electrical power generated by the fuel cell;

subtracting an electrical power consumption of the air compressor;

dividing a result of the total electrical power generated by the fuel cell minus the electrical power consumption of the air compressor by the total electrical power generated by the fuel cell and multiplying an overall result by 100% to arrive at an efficiency percentage; and adjusting the power generated by the fuel cell based on said efficiency percentage, wherein the selection of a power generation mode comprises the further steps of:

selecting an idle stop mode, said idle stop mode being selected based on a determination that electrical power stored in said power storage device exceeds a predetermined parameter;

stopping the generation of electrical current by said fuel cell; and using the power storage device to supply electrical power to said driving motor and said auxiliary equipment.

2. The method of claim 1, wherein the electrical power load of the electrical load includes the power requirements of said driving motor, the power requirements of said air compressor used to supply hydrogen from said hydrogen supply to said fuel cell and the power requirements of said auxiliary equipment in said fuel cell vehicle.

3. The method of claim 1, wherein said generated electrical current is stored in said power storage device.

4. The method of claim 1, comprising the further steps of:

identifying a need for increased electrical power while in said idle charge mode; and exiting said idle charge mode to return to a normal power generation mode, said normal power generation mode supplying electrical current directly from said fuel cell to said driving motor and said auxiliary equipment.

5. In a fuel cell vehicle equipped with a fuel cell, an idle control system, a driving motor, a power storage device, a hydrogen supply, an air compressor and auxiliary equipment, a method of generating electrical current comprising the steps of:

identifying the occurrence of an idle state, said idle state being based on at least one of the speed of said fuel cell vehicle being lower than a predetermined value, the expected power consumption of the driving motor being lower than a predetermined value or an electrical power load of an electrical load being lower than a predetermined value;

selecting a power generation mode in response to the occurrence of the idle state; and adjusting the power generation of the fuel cell based on the selected power generation mode using said idle control system, wherein the selection of a power generation mode comprises the steps of:

selecting an idle stop mode, said idle stop mode being selected based on a determination that electrical power stored in said power storage device exceeds a predetermined parameter;

stopping the generation of electrical current by said fuel cell; and using the power storage device to supply electrical power to said driving motor and said auxiliary equipment.

* * * * *